Feb. 18, 1936. W. W. HARRIS 2,031,311
CLUTCH
Filed Feb. 9, 1931 2 Sheets-Sheet 2

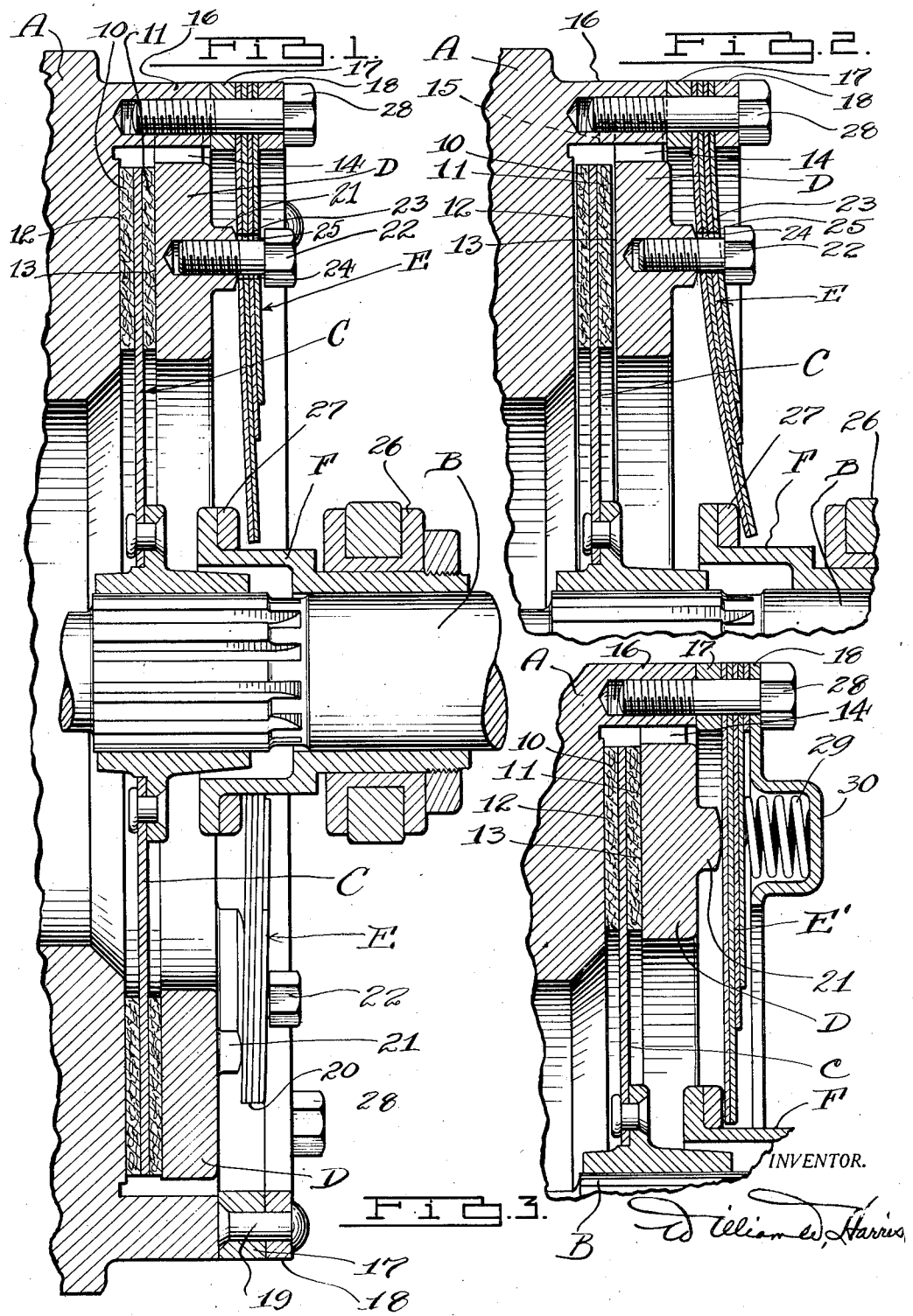

INVENTOR.
William W. Harris

Patented Feb. 18, 1936

2,031,311

UNITED STATES PATENT OFFICE 2,031,311

CLUTCH

William W. Harris, Detroit, Mich., assignor to Continental Motors Corporation, Detroit, Mich., a corporation of Virginia Application February 9, 1931, Serial No. 514,435

34 Claims. (Cl. 192—68)

This invention relates to clutches particularly of the type adapted for use in motor vehicles and has among its objects the provision of a clutch of simplified construction and further characterized by an improved operation.

A further object of my invention resides in the provision of a clutch construction which eliminates certain parts now used in conventional clutches to the end that my clutch may be manufactured at considerably less cost than conventional clutches.

A further object of my invention resides in the provision of a clutch having smooth engagement, free from grabbing or chattering tendencies. My clutch construction is preferably used in connection with a driven element or disc presenting full face contact at the time of clutch engagement thereby resulting in a clutch disc of long life and at the same time providing a clutch construction which will not chatter or grab with this type of disc. If desired, however, my clutch construction may be used in combination with other types of discs such as commonly found in conventional clutches.

Figure 4:
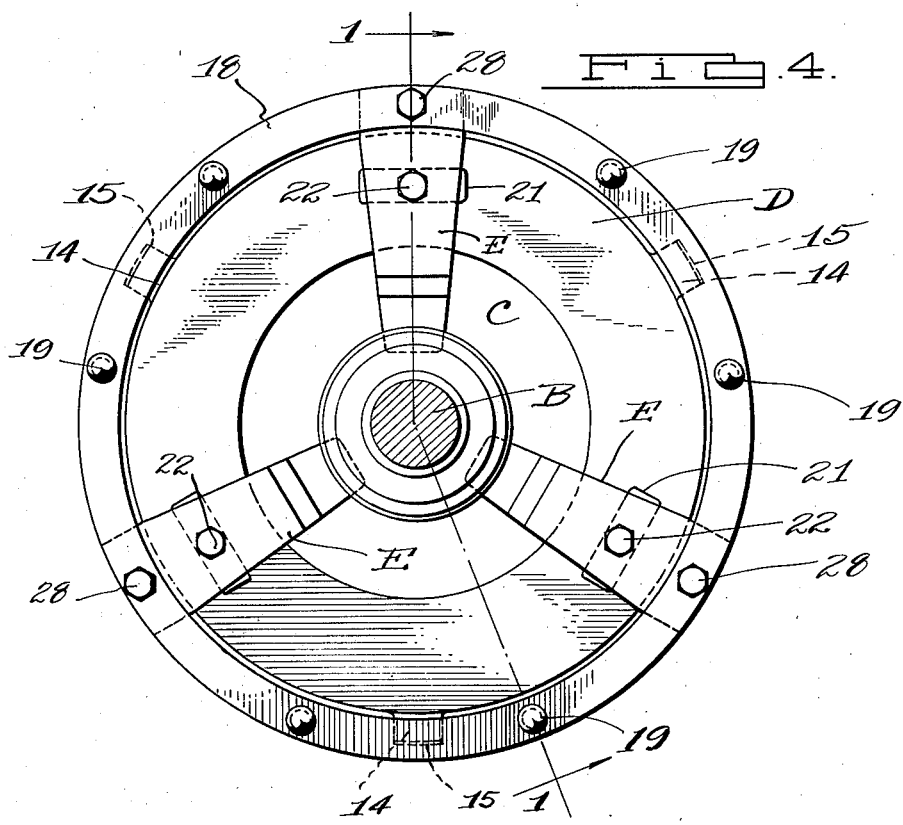
Figure 5:
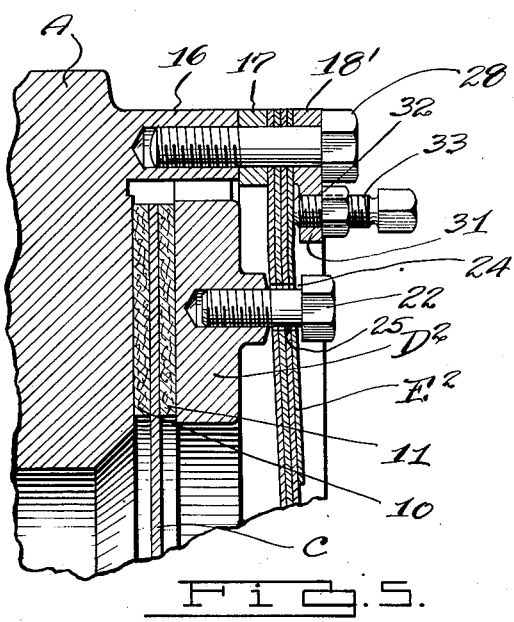

Further important objects and advantages of my clutch will be apparent as this specification progresses and the salient features of my invention are disclosed in the accompanying drawings in which:

Figure 1 is a sectional view through the clutch assembly showing the parts in clutching relation, this view being taken along the line 1—1 of Figure 4, Figure 2 is a detail sectional view corresponding to Figure 1 but showing the parts in declutching relation, Figure 3 is a sectional view corresponding to Figure 2 showing a slightly modified construction, Figure 4 is a rear elevation view of the clutch shown in Figures 1 and 2, and Figure 5 is a detail sectional view showing a further modified construction.

Referring to the drawings I have illustrated my improved clutch in combination with a driving means which according to present practice in the automotive field is the flywheel A, the usual driven means being illustrated by the driven shaft B to which is secured a driven element C in the form of a disc carrying the friction mats 10 and 11 adapted for frictional engagement with the driving flywheel face 12 and the driving face 13 of the driving element or pressure plate D. The latter plate is suitably driven from the flywheel A as by lugs 14 engageable in slots 15 located in the flywheel flange 16 whereby the pressure plate D may be moved axially of the shaft B for effecting a clutching or declutching action with the disc C.

Removably secured to the flywheel flange 16 are the annular members 17, 18 preferably secured together as a unit by any suitable means such as spaced rivets 19, these members adapted at spaced circumferential points to receive and clamp therebetween the pressure plate controlling or spring devices E. Each of these spring devices constitutes a flat assembly consisting of a plurality of layers of spring steel elements capable of sliding on each other in a manner commonly experienced with leaf spring assemblies and the outer ends of the spring devices E are received in suitable openings in the member 17 for assembly. The devices E lie substantially in a plane perpendicular to the axis of the driven means or shaft B. The spring devices are caused to act on the pressure plate D at a point preferably intermediate the lengths of the spring devices as illustrated in Figure 1 wherein the pressure plate lugs 21 engage the spring devices, the lugs 21 carrying headed members 22 which may pass through openings 23 in the spring devices. I preferably provide a clearance at 25 between the members 22 and the associated spring devices and also a further clearance at 24 whereby the spring devices have a certain amount of free movement without actuating the headed member 22. The inner ends of the spring members E are arranged for actuation by a collar F slidably engaging the shaft B and adapted to be actuated by the ring 26 which is controlled by the usual clutch pedal (not shown). The collar F also has a flange 27 so that for a declutching operation the flange 27 may be moved to the right or from the position shown in Figure 1 to the position shown in Figure 2 thereby flexing the spring devices E to remove the loading or pressure exerted by the spring devices on the pressure plate D.

I desire to point out that any number of spring devices may be provided and other suitable spring means may be employed in some instances instead of spaced spring assemblies E as particularly shown in the illustrated embodiment of my invention, although the general arrangement of these elements as separate assemblies may be sometimes preferred. It will be noted that the pressure plate D is tied by the members 22 with the spring assemblies E and that the latter assemblies are secured or clamped between the ring members 17 and 18 so that all of these parts may be constructed as a separate assembly or unit and readily attached or detached to the flywheel A by reason of the spaced bolts 28.

An important feature of my invention resides in the provision of the spring members E which in themselves are adapted to load the pressure plate D preferably without the necessity of additional spring means although where such additional spring means is desired they may be conveniently arranged in the assembly as shown in Figure 3 hereinafter referred to more in detail. The springs E being anchored or clamped at their outer ends provide cantilevers.

The clutch elements are assembled so as to initially stress the spring devices E and place the desired clutching pressure on the plate D; thus in Figure 1 the parts are in their normal clutching position wherein the flywheel A is driving the shaft B through the disc C. When it is desired to effect a declutching action, the collar F is moved so as to flex the inner ends of the spring devices E and during this flexing operation the initial loading of the spring devices E on the pressure plate will be relieved and in the later stages of the declutching action the spring devices E will act on the headed members 22 and positively move the pressure plate away from the clutch disc so as to free the driving action. When the collar F is moved to the left to effect a clutching action it will be noted that the pressure plate D will be moved to the left as illustrated in the drawings whereby an initial contact between the pressure plate and disc will be effected at a minimum initial pressure which gradually builds up to the final desired pressure as the spring devices E are permitted to straighten from their flexed position in Figure 2. By reason of such arrangement the usual chattering or grabbing tendencies of the flat type of clutch disc will ordinarily be removed so as to permit the use of this type of clutch disc with its resulting benefits of a very long life disc.

Referring to Figure 3 the parts are arranged generally in a corresponding manner to Figures 1 and 2 although the auxiliary spring devices 29 are provided between the cover plate 30 and the spring devices E' so as to produce an additional loading on the pressure plate D.

Referring to Figure 5, I have illustrated the similar arrangement of spring devices E2 which cooperate with the pressure plate D2 as described in connection with Figures 1 and 2 although in Figure 5 I have constructed the ring 18' with spaced flanges 31 at the points adjacent the spring devices E2 these flanges being adapted to threadedly receive at 32 an adjusting screw 33. The adjusting screws bear on the spring devices E2 and provide a very convenient means of loading these spring devices in an adjustable manner so that wear of the clutch disc may be taken up by suitably advancing the pressure plate D2 through the spring devices E2. Further, by reason of the adjusting members 33 any desired initial loading may be placed on the spring devices E2.

One important advantage obtained by reason of my invention resides in the provision of the spring devices E which may be accommodated within the space ordinarily provided in flywheel assemblies and at the same time permit the use of relatively long springs which may be clamped at their outer ends adjacent the points where they act on the pressure plate. This provides a very rigid construction at the outer ends with resulting desired high pressures for effecting the clutching action while at the same time the relatively remote inner ends of the springs are very flexible and easily controlled in moving the pressure plate, and further attaining a relatively soft or easily actuable clutch pedal action.

While I have described the yielding devices E as "levers" or "lever means", or like expressions in my specification and in certain of the claims, I desire to point out that these devices E are not levers in the true sense. However, the devices E are lever-like in their functions of advantageously loading and unloading the pressure plate D and the longer these devices E are, the easier it is to actuate them at their inner ends and the better is the loading action.

Various modifications and changes in the details of construction as have been described for purpose of illustration will be apparent from my disclosure and I do not desire to limit my invention to the exact disclosure except as may be specifically pointed out in the appended claims.

What I claim as my invention is:

1. In a clutch, driving means, driven means, a clutch element secured to the driven means and engageable with the driving means, a pressure plate driven with the driving means and movable axially of the driven means for engagement with the clutch element, and a yielding device anchored to and driven with the driving means and yieldingly effecting clutching engagement of the pressure plate and clutch element, and means engaging said yielding device for moving same to de-clutch said pressure plate and clutch element.

2. In a clutch, driving means, driven means, a clutch element secured to the driven means and engageable with the driving means, a pressure plate driven with the driving means and movable axially of the driven means for engagement with the clutch element, and a yielding pressure plate actuating device extending generally between the driving means and driven means, said device having a portion thereof secured to said driving means and having a portion remote from said first portion adapted for flexing to move the pressure plate for de-clutching action.

3. In a clutch, driving means, driven means, said driving and driven means including relatively movable elements for clutching and de-clutching action, a laminated spring clamped to one end thereof to the driving means and having an intermediate portion thereof adapted to load one of said elements, and means slidable axially of the driven means for moving the other end of said spring to unload the last said element.

4. In a clutch, driving means, driven means, said driving and driven means including relatively movable elements for clutching and de-clutching action, a laminated spring element actuator having an outer portion secured to the driving means and having an inner portion adjacent said driven means, and means engaging said spring to actuate one of said elements.

5. In a clutch, driving means, driven means, said driving and driven means including relatively movable elements for clutching and de-clutching action, and a laminated spring element actuator clamped at one end thereof to the driving means and having its opposite end extending adjacent the driven means for declutching movement.

6. In a clutch, driving means, driven means, a clutch element secured to the driven means and engageable with the driving means, a pressure plate driven with the driving means and movable axially of the driven means for engagement with the clutch element, a yielding device comprising a spring lever driven with the driving means and yieldingly effecting clutching engagement of the pressure plate and clutch element, means carried by the driven means and engageable with said yielding device for de-clutching said pressure plate and driving means, and means uniting the pressure plate and yielding device to form a unitary structure thereof attachable or detachable to or from said driving means.

7. In a clutch, driving means, driven means, said driving and driven means including relatively movable elements for clutching and de-clutching action, a laminated spring device secured to the driving means adapted to load one of the movable elements, said spring device lying substantially in a plane perpendicular to the axis of said driven means, and means permitting attachment of said laminated spring device and the last said element as a unit to said driving means.

8. In a clutch, driving means, driven means, said driving and driven means including relatively movable elements for clutching and de-clutching action, and lever means comprising a plate spring structure operatively associated with and extending substantially parallel with the movable elements, an intermediate portion of said lever means acting on one of said elements to effect clutching action thereof.

9. In a clutch, driving means, driven means, said driving and driven means including relatively movable elements for clutching and de-clutching action, a member having an outer portion clamped to the driving means, means actuating an inner portion of said member to effect de-clutching action of said relatively movable elements and spring means acting on said member to load one of said relatively movable elements.

10. In a clutch, driving means, driven means, said driving and driven means including relatively movable elements for clutching and de-clutching action, a yielding lever clamped to the driving means and loading one of said elements, means for moving said lever to an unloading position, and adjusting means acting on said yielding lever for moving the movable element aforesaid for taking up clutch wear.

11. In a clutch, driving means, driven means, said driving and driven means including relatively movable elements for clutching and de-clutching action, a spring secured against longitudinal movement thereof to the driving means and adapted to load one of the movable elements, and adjusting means carried by the driving means and actuable on said spring intermediate its length.

12. In a clutch having a driving flywheel and driven shaft, a disc assembly secured to the shaft, a pressure plate driven with the flywheel and engageable with the disc assembly for clutching action between the flywheel and shaft, a flexible device extending radially of the shaft, said device having an outer portion anchored to the flywheel and an inner portion adjacent said shaft, said device having an intermediate portion acting to move the pressure plate toward the disc assembly, and means slidable axially of said shaft for flexing the inner portion of said device to de-clutch the pressure plate.

13. In a clutch having a driving flywheel and driven shaft, a disc assembly secured to the shaft, a pressure plate driven with the flywheel and engageable with the disc assembly for clutching action between the flywheel and shaft, a flexible device extending radially of the shaft, said device having an outer portion anchored to the flywheel and an inner portion adjacent said shaft, said device having an intermediate portion acting to move the pressure plate toward the disc assembly, and means slidable axially of said shaft for flexing the inner portion of said device to de-clutch the pressure plate, said device comprising a plurality of flat contacting springs.

14. In a clutch having a driving flywheel and driven shaft, a disc assembly secured to the shaft, a pressure plate driven with the flywheel and engageable with the disc assembly for clutching action between the flywheel and shaft, a flexible device extending radially of the shaft, said device having an outer portion anchored to the flywheel and an inner portion adjacent said shaft, said device having an intermediate portion acting to move the pressure plate toward the disc assembly, and means slidable axially of said shaft for flexing the inner portion of said device to de-clutch the pressure plate, said device comprising a plurality of flat contacting springs, one of which is radially longer than another to impart flexibility to said device at said inner portion thereof.

15. In a clutch having a driving flywheel and driven shaft, a disc assembly secured to the shaft, a pressure plate driven with the flywheel and engageable with the disc assembly for clutching action between the flywheel and shaft, a flexible device extending radially of the shaft, said device having an outer portion anchored to the flywheel and an inner portion adjacent said shaft, said device having an intermediate portion acting to move the pressure plate toward the disc assembly, and means slidable axially of said shaft for flexing the inner portion of said device to de-clutch the pressure plate, and a coil spring loading said device at said intermediate portion thereof.

16. In a clutch having a driving flywheel and driven shaft, a disc assembly secured to the shaft, a pressure plate driven with the flywheel and engageable with the disc assembly for clutching action between the flywheel and shaft, a flexible device extending radially of the shaft, said device having an outer portion anchored to the flywheel and an inner portion adjacent said shaft, said device having an intermediate portion acting to move the pressure plate toward the disc assembly, and means slidable axially of said shaft for flexing the inner portion of said device to de-clutch the pressure plate, and adjustable means for establishing pressure on the pressure plate from said device.

17. In a clutch having a driving flywheel and driven shaft, a disc assembly secured to the shaft, a pressure plate driven with the flywheel and engageable with the disc assembly for clutching action between the flywheel and shaft, a flexible device extending radially of the shaft, said device having an outer portion anchored to the flywheel and an inner portion adjacent said shaft, said device having an intermediate portion acting to move the pressure plate toward the disc assembly, and means slidable axially of said shaft for flexing the inner portion of said device to de-clutch the pressure plate, said intermediate portion of said device contacting with the pressure plate.

18. In a clutch, driving means, driven means, relatively movable driving and driven elements connected in driving relation with said driving means and with said driven means respectively, a de-clutching member movable axially of the driven means, and spring lever means anchored on said driving means and extending inwardly therefrom toward said driven means and acting intermediate the de-clutching member and said driving element, said spring lever means being flexed by said de-clutching member for loading or unloading said driving element in response to movement of said de-clutching member whereby to drivingly connect or disconnect said elements.

19. In a clutch, driving means, driven means, relatively movable driving and driven elements connected in driving relation with said driving means and with said driven means respectively, a de-clutching member movable axially of the driven means, and a laminated spring lever means anchored on said driving means and extending inwardly therefrom toward said driven means and acting intermediate the de-clutching member and said driving element, said lever means loading and unloading said driving element in response to movement of said de-clutching member whereby to drivingly connect or disconnect said elements.

20. In a clutch, a driving structure, a pressure plate structure, a driven shaft, a driven disc, and a yielding cantilever device anchored to one of said structures and extending generally inwardly toward said shaft, said device having an intermediate zone loading said other structure, the inner end of said device being actuated to disengage said driven disc from said structures.

21. In a clutch, a driving structure, a pressure plate structure, a driven shaft, a driven disc, a yielding cantilever device anchored to one of said structures and extending generally inwardly toward said shaft, said device having an intermediate zone loading said other structure, the inner end of said device being adapted for de-clutching actuation, and spring means acting on the intermediate zone of said device to load said structure loaded thereby.

22. In a clutch, a driving structure, a pressure plate structure, a driven shaft, a driven disc, a yielding cantilever device anchored to one of said structures and extending generally inwardly toward said shaft, said device having an intermediate zone loading said other structure, the inner end of said device being adapted for de-clutching actuation, and adjustable means acting on said device to adjustably vary the load applied by said device on the structure loaded thereby whereby to take up clutch wear.

23. In a clutch, a flywheel, a pressure plate, a driven shaft, a yielding cantilever anchored at its outer end thereof with said flywheel and having a free inner end extending generally inwardly toward said shaft, said cantilever having an initial set before assembly, said cantilever having an intermediate zone acting to load said pressure plate.

24. In a clutch, a flywheel, a pressure plate, a driven shaft, a yielding cantilever anchored at its outer end thereof with said flywheel and having a free inner end extending generally inwardly toward said shaft, said cantilever having an initial set before assembly, said cantilever having an intermediate zone acting to load said pressure plate, and means for moving the inner end of said cantilever for declutching actuation.

25. In a clutch, a flywheel, a pressure plate, a driven shaft, a yielding cantilever anchored at its outer end thereof with said flywheel and extending generally inwardly toward said shaft, an intermediate portion of said cantilever tied to said pressure plate and acting to load the said pressure plate, and means for moving the inner end of said cantilever for de-clutching actuation.

26. In a clutch, a driving structure, a pressure plate structure, a driven shaft, a driven disc, and a yielding laminated cantilever device anchored to one of said structures and extending generally inwardly toward said shaft, an intermediate portion of said laminated device acting to load said other structure, and means for moving the inner end of said device for declutching action.

27. In a clutch, driving means, a pressure plate driven with said driving means, driven means, a disc driven with said driven means, a yielding member anchored with the driving means, said yielding member loading said pressure plate, and means acting on the yielding member for transmitting motion therethrough to unload the pressure plate.

28. In a clutch, driving means, a pressure plate driven with said driving means, driven means, a disc driven with said driven means, a yielding member anchored with the driving means, said yielding member loading said pressure plate, and means acting on the inner end of the yielding member for transmitting motion therethrough to unload the pressure plate.

29. In a clutch, driving means, a pressure plate driven with said driving means, driven means, a disc driven with said driven means, a yielding member anchored with the driving means, said yielding member having an initial set prior to assembly and acting to load said pressure plate, and means acting on the yielding member for transmitting motion therethrough to unload the pressure plate.

30. In a clutch, driving means, a pressure plate driven with said driving means, driven means, a disc driven with said driven means, a yielding member anchored with the driving means, said yielding member including a plurality of superimposed substantially flat spring elements acting to load said pressure plate, and means acting on the yielding member for transmitting motion therethrough to unload the pressure plate.

31. In a clutch, driving means, a pressure plate driven with said driving means, driven means, a disc driven with said driven means, a yielding member anchored with the driving means, said yielding member including a plurality of superimposed substantially flat elements having an initial set prior to assembly and acting to load said pressure plate on assembly, and means acting on the yielding member for transmitting motion therethrough to unload the pressure plate.

32. In a clutch, driving means, a driving element driven with said driving means, driven means, a driven element driven with said driven means and adapted for clutching engagement with said driving element, a yielding device anchored with the driving means and extending generally inwardly toward the driven means, said yielding device including a plurality of superimposed substantially flat spring elements acting to load said driving element, and means acting on the inner end of said device for transmitting motion therethrough to unload the driving element whereby to declutch said driving and driven elements.

33. In a clutch, driving means, a driving element driven with said driving means, driven means, a driven element driven with said driven means and adapted for clutching engagement with said driving element, a yielding laminated cantilever device anchored at its outer end with the driving means and extending generally inwardly toward the driven means, said device including a plurality of superimposed substantially flat spring elements, said device having an intermediate portion loading said driving element, and means moving the inner end of said device to unload the driving element whereby to declutch said driving and driven elements.

34. In a clutch, driving means, a driving element driven with said driving means, driven means, a driven element driven with said driven means and adapted for clutching engagement with said driving element, a yielding laminated cantilever device anchored at its outer end with the driving means and extending generally inwardly toward the driven means, said device including a plurality of superimposed substantially flat spring elements, said device having an intermediate portion loading said driving element, and a declutching member movable axially of said driven means and engaging the inner end of said device for transmitting motion therethrough to unload the driving element.

WILLIAM W. HARRIS.